US006616564B2

(12) United States Patent
Shibukawa

(10) Patent No.: US 6,616,564 B2
(45) Date of Patent: Sep. 9, 2003

(54) INFINITELY VARIABLE TRANSMISSION

(75) Inventor: Yuichi Shibukawa, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/083,396

(22) Filed: Feb. 27, 2002

(65) Prior Publication Data

US 2002/0128110 A1 Sep. 12, 2002

(30) Foreign Application Priority Data

Mar. 7, 2001 (JP) ....................................... 2001-062938

(51) Int. Cl.[7] ................................................ F16H 37/02
(52) U.S. Cl. ...................................................... 475/216
(58) Field of Search ................................. 475/215, 216

(56) References Cited

U.S. PATENT DOCUMENTS 5,935,039 A 8/1999 Sakai et al.
6,517,461 B2 * 2/2003 Shimizu ..................... 475/216

FOREIGN PATENT DOCUMENTS

EP 1 024 315 A2 8/2000
JP 11-63139 3/1999
JP 2000-213623 8/2000

OTHER PUBLICATIONS

W. Beitz, “Dubbel—Teaschenbuch für den Maschinenbau,” Springer–Verlag, 1990, 7 Sheets, XP002204073.

* cited by examiner

*Primary Examiner*—Dirk Wright
(74) *Attorney, Agent, or Firm*—Foley & Lardner

(57) ABSTRACT

A continuously variable transmission (2) has a first helical gear (204A) for its rotation output. The fixed speed ratio transmission (3) has a second helical gear (203B) for its rotation output. The third helical gear (207) rotates according to the difference of the rotation speeds of the first helical gear (204A) and second helical gear (203B). These helical gears rotate on a same rotation shaft (204). One of the three helical gears positioned between the other two helical gears applies a bending moment on the rotation shaft (204) due to a radial force given by a gear meshed therewith. The direction of the tooth trace of the other two helical gears is set so that at least one of them produces a bending moment in an opposite direction to the first bending moment.

26 Claims, 12 Drawing Sheets

INFINITELY VARIABLE TRANSMISSION

FIELD OF THE INVENTION

This invention relates to the setting of the tooth trace of helical gears in an infinitely variable transmission.

BACKGROUND OF THE INVENTION

Tokkai 2000-213623 published by the Japanese Patent Office in 2000 discloses an infinitely variable transmission (IVT) for a vehicle which combines a fixed speed ratio transmission, a continuously variable transmission (CVT) and a planetary gear set.

In this IVT, the output of the CVT is transmitted to a sun gear which is fixed to a central shaft of the planetary gear set through a chain. The output of the fixed speed ratio transmission is transmitted to the planet carrier of the planetary gear set. The ring gear of the planetary gear set is fixed to the output shaft of the IVT which is supported on an outer periphery of the central shaft. The planetary gear set varies the speed and direction of rotation of the ring gear in response to the difference between the rotation speed of the planet carrier and the sun gear and transmits torque to the drive shaft of the vehicle through an IVT output gear which is fixed on the output shaft.

A low-noise helical gear is used on the IVT output gear and in the fixed speed ratio transmission. The tooth trace of these helical gears is set to eliminate the bending moment applied on the central shaft by the tension of the chain.

SUMMARY OF THE INVENTION

Tokkai Hei 11-63139 published by the Japanese Patent Office in 1999 discloses an IVT which transmits the output of the CVT to the sun gear of the planetary gear set by combining two helical gears without the use of a chain. The two helical gears transmit rotations in an opposite direction to the direction of rotation of the chain. As a result, the direction of rotation of the sun gear is opposite to the direction of rotation of the sun gear in the IVT disclosed in Tokkai 2000-213623. In this IVT, the direction of rotation of the sun gear and the planet carrier are arranged to reverse the direction of the output rotations of the fixed speed ratio transmission using a counter gear.

Since this IVT transmits the CVT output to the sun gear using a helical gear, the application of a bending moment on the central shaft differs from the IVT disclosed in Tokkai 2000-213623.

It is therefore an object of this invention to reduce the bending moment applied to the output shaft in an IVT in which the CVT output is transmitted to the planetary gear via helical gears.

In order to achieve the above object, this invention provides a special arrangement of an infinitely variable transmission comprising an input shaft, a continuously variable transmission which outputs a rotation of the input shaft to a first helical gear at an arbitrary speed ratio, a fixed speed ratio transmission which outputs a rotation of the input shaft to a second helical gear at a fixed speed ratio, and a third helical gear which changes a rotation direction and a rotation speed according to a difference between a rotation speed of the first helical gear and a rotation speed of the second helical gear.

In this infinitely variable transmission, the first helical gear, the second helical gear and the third helical gear are supported on a common rotation shaft such that one of the first helical gear, the second helical gear and the third helical gear is disposed between the other two gears. One of the other two gears has a tooth trace which generates a thrust force exerting a bending moment on the rotation shaft in a direction opposite to a direction of a bending moment exerted by a radial force acting on the gear which is disposed between the other two gears on the rotation shaft.

The details as well as other features and advantages of this invention are set forth in the remainder of the specification and are shown in the accompanying drawings.

DESCRIPTION OF THE PREFERRED EMBODIMENTS

Figure 1:
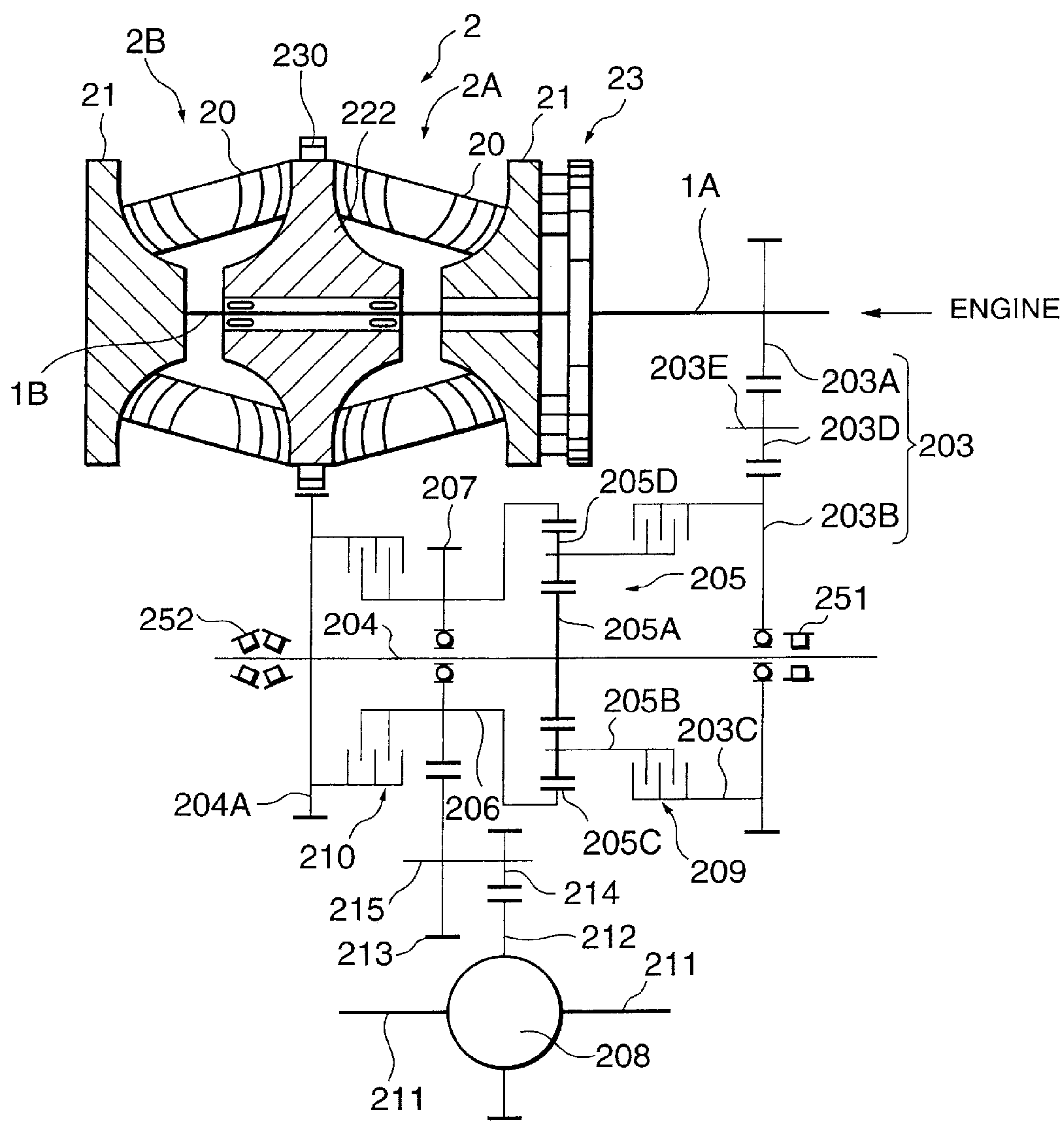
FIG. 1 is a schematic diagram of an infinitely variable transmission (IVT) according to this invention.

Referring to FIG. 1 of the drawings, an infinitely variable transmission (hereinafter referred to as an IVT) for a vehicle comprises an IVT input shaft 1A and an IVT output shaft 206 disposed in parallel, a fixed speed ratio transmission 203, a toroidal continuously variable transmission (hereinafter referred to as a (CT) 2 and planetary gear set 205, a power recirculation clutch 209, a direct clutch 210 and an IVT output gear 207.

The IVT input shaft 1A is engaged with the engine. The IVT output shaft 206 is a hollow shaft which is supported to rotate freely about and coaxially with respect to a central shaft 204 of the planetary gear set. Both ends of the central shaft 204 are respectively supported on the IVT housing (not shown) through bearings 251, 252.

The fixed speed ratio transmission 203 comprises an input gear 203A fixed to the IVT input shaft 1A, an output gear 203B supported to rotate freely on an outer periphery of the central shaft 204, and a counter gear 203D which meshes with the output gear 203B and the input gear 203A and which is supported on a counter shaft 203E. The gears 203A, 203E, 203B comprise helical gears.

The CVT 2 is provided with a CVT input shaft 1B which is disposed coaxially with respect to the IVT input shaft 1A, and a pair of toroidal units 2A, 2B arranged on the CVT input shaft 1B.

The toroidal units 2A, 2B comprise an input disk 21 which is fixed to the CVT input shaft 1B, an output disk 222 which is supported to rotate freely on the CVT input shaft 1B and a pair of power rollers 20 which are gripped between the disks. The output disks 222 of the toroidal units 2A and 2B are integrated with a CVT output gear 230 being fixed to the outer periphery of the output disk 222.

The input disk 21 of the toroidal unit 2A is biased in an axial direction by a loading cam device 23 which generated a thrust force in response to the rotation of the IVT input shaft 1A. As a result, the input disks 21 rotate together with the IVT input shaft 1A, and the input disk 21 of the toroidal unit 2A and the input disk 21 of the toroidal unit 2B tend to move towards each other and grip the power rollers 20 as a result of the thrust force. The CVT 2 performs arbitrary variation of the speed ratio of the input disk 21 and the output disk 22 by varying the gyration angle of the power rollers 20 using hydraulic pressure. U.S. Pat. No. 5,935,039 discloses CVT speed ratio control using hydraulic pressure in the above manner.

The CVT output gear 230 meshes with a gear 204A which is fixed on the central shaft 204. The gears 230 and 204A comprise helical gears.

The power recirculation clutch 209, the planetary gear set 205 and the direct clutch 210 are disposed between the output gear 203B of the fixed speed ratio transmission 203 and the gear 204A which are on the central shaft 204.

The planetary gear set 205 comprises a sun gear 205A which is fixed to the central shaft 204, a ring gear 205C which is disposed coaxially to the outer side of the sun gear 205A, planet gears 205D which are pinions arranged between the sun gear 205A and ring gear 205C, and a planet carrier 205B which supports the planet gears 205D so as to be free to rotate and free to turn around the sun gear 205A. The sun gear 205A, the planet gears 205D and the ring gear 205C comprise helical gears. The sun gear 205A and the planet gears 205D are external contact gears. The ring gear 205C is an internal contact gear.

The ring gear 205C is fixed to the IVT output shaft 206 and the IVT output shaft 206 is engaged with the gear 204A through the direct clutch 210.

The planet carrier 205B is engaged with the output gear 203B of the fixed speed ratio transmission 203 through the power recirculation clutch 209.

When in an engaged state, the direct clutch 210 connects the gear 204A and the IVT output shaft 206 to rotate together. When in a disengaged state, the direct clutch 210 allows relative rotation of the gear 204A and the IVT output shaft 206. When in an engaged state, the power recirculation clutch 209 connects the gear 203B of the fixed speed ratio transmission 203 and the planet carrier 205B to rotate together. When in a disengaged state, the power recirculation clutch 209 allows relative rotation of the output gear 203B and the planet carrier 205B. The direct clutch 210 and the power recirculation clutch 209 are respectively operated using hydraulic pressure. The above mentioned U.S. Pat. No. 5,935,039 discloses the operation of these clutches using hydraulic pressure.

The IVT output gear 207 is fixed to the IVT output shaft 206. The rotation of the IVT output gear 207 is transmitted to a final gear 12 of a differential 208 through a gear 213 and a gear 214 fixed to a counter shaft 215. A pair of drive shafts 211 connected to drive wheels of the vehicle are rotated by the differential 208. The IVT output gear 207 and the gear 213 comprise helical gears.

Figure 3:
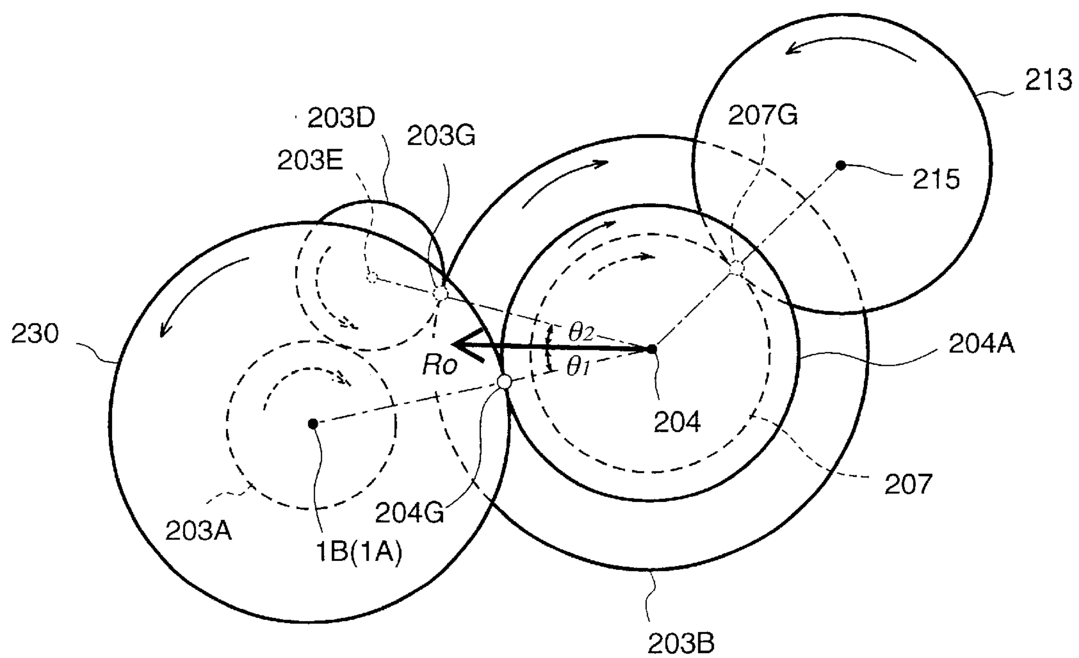
FIG. 3 is a schematic sectional view of helical gears.

In this IVT, the transmission of rotational force to the drive wheels from the engine is performed through the five shafts comprising the IVT input shaft 1A, the IVT output shaft 206, the counter shaft 203E, the counter shaft 215 and the drive shaft 211. Although these shafts are shown in a coplanar orientation in FIG. 1 in order to simplify description, the actual orientation as shown in FIG. 3 is not coplanar.

This IVT selectively switches between power recirculation mode in which the power recirculation clutch 209 is engaged and the direct clutch 210 is disengaged and direct mode in which the power recirculation clutch 209 is disengaged and the direct clutch 210 is engaged.

In power recirculation mode, the output rotation of the fixed speed ratio transmission 203 is transmitted to the planet carrier 205B of the planetary gear set 205 from the output gear 203B. The output rotation of the CVT 2 is transmitted to the sun gear 205A of the planetary gear set 205 through the central shaft 204. The planetary gear set 205 rotates the ring gear 205C in response to the relative rotation of the planet carrier 205B and the sun gear 205A.

The rotation of the ring gear 205C is output to the drive shafts 211 through the IVT output gear 207 and the gear 213, the gear 214, the final gear 212 and the differential 208. The direction of rotation of the ring gear 205C depends on the relative rotation of the planet carrier 205B and the sun gear 205A, i.e., the differential between the output rotation speed of the fixed speed ratio transmission 203 and the output rotation speed of the CVT 2. The output rotation speed of the fixed speed ratio transmission 203 is normally fixed with respect to the engine rotation speed.

However, the CVT output rotation speed varies continuously in response to the gyration angle of the power rollers 20. Thus the IVT transmits the engine output rotation to the drive shafts 211 at an arbitrary speed ratio from forward to reverse vehicle operation by varying the gyration angle of the CVT 2.

In direct mode, the output rotation of the CVT 2 is output directly to the IVT output gear 207 through the direct clutch 210 in the engaged state. In contrast, the output gear 230B of the fixed speed ratio transmission 203 is cut off from the planet carrier 205B and rotates freely because the power recirculation clutch 209 is disengaged. Thus the output rotation of the CVT 2 is transmitted directly to the drive shaft 211 during direct mode.

Power recirculation mode is used to obtain a large IVT speed ratio for reverse or low-speed forward vehicle operation. Direct mode is used to obtain a small IVT speed ratio for high-speed forward vehicle operation.

Referring to FIGS. 2, 3 and 4A–4C, the setting of the direction of the face advance of the tooth trace of the IVT output gear 207, the gear 204A and the output gear 203B of the fixed speed ratio transmission 203 will be described. (Note: It is convenient to the readers that the figure number reference is indicated at the top of the paragraph.)

In power recirculation mode, the torque applied to the output gear 203B, the gear 204A and the IVT output gear 207 is larger than the torque applied to the same gears during direct mode. As a result, a thrust force which is applied to the engagement sections 203G, 204G, and 207G of these three helical gears with the other gears is greater than the thrust force which is applied to the same engagement sections during direct mode. Consequently a larger bending moment is applied to the central shaft 204 during power recirculation mode than during direct mode.

The time required for the IVT to transmit torque for forward vehicle operation is conspicuously greater than the time required to transmit torque for reverse vehicle operation. Therefore the direction of the tooth trace of respective helical gears is set with the object of reducing the bending moment applied to the central shaft 204 during forward vehicle operation in power recirculation mode.

Figure 2:
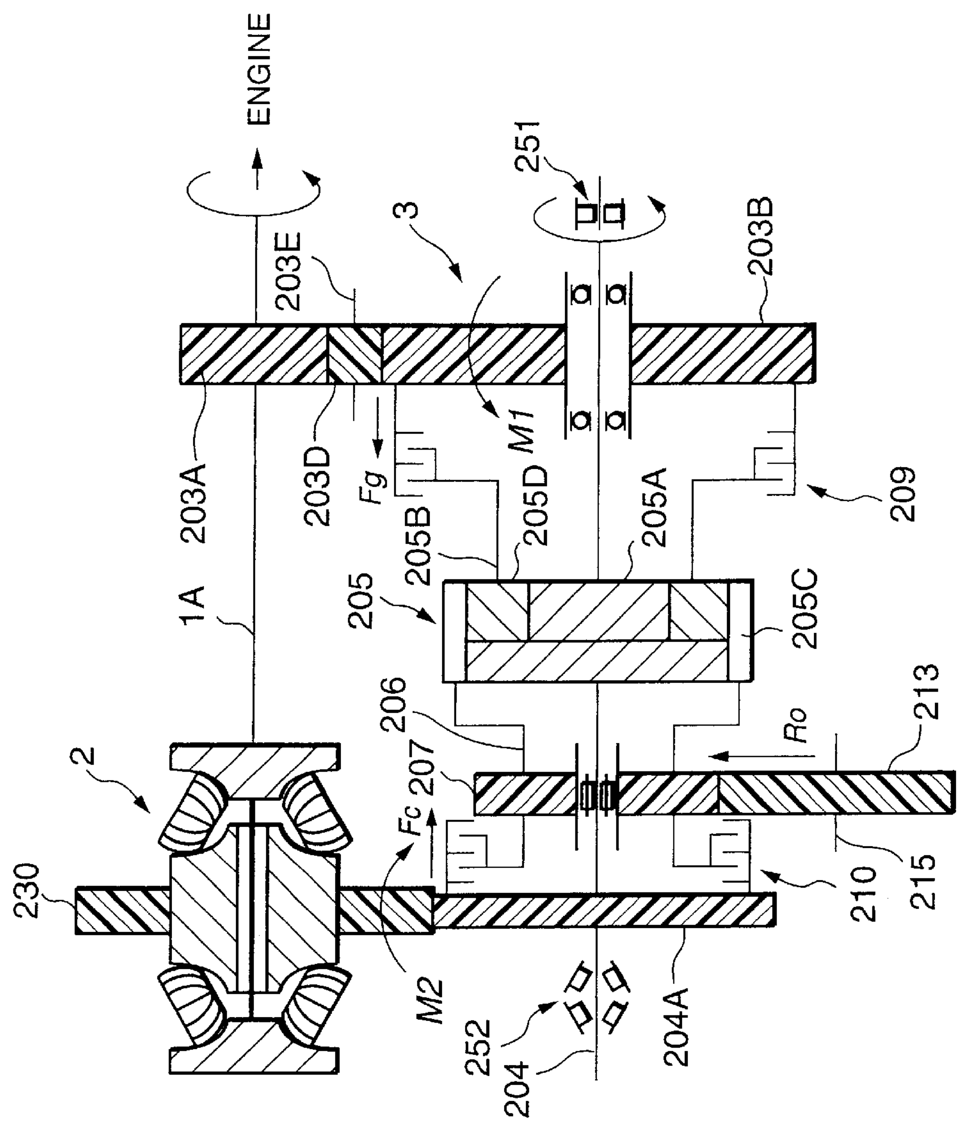
FIG. 2 is a schematic diagram of the IVT showing the setting of the tooth traces of helical gears according to this invention.

Referring now to FIG. 3, the IVT input shaft 1A and the CVT input shaft 1B rotate in a clockwise direction when the IVT is viewed from the left-hand side of FIG. 2.

Thus in the fixed speed ratio transmission 203, the input gear 203A fixed to the IVT input shaft 1A rotates in a clockwise direction, the counter gear 203D rotates in a counter-clockwise direction and the output gear 203B and the planet carrier 205B respectively rotate in a clockwise direction.

With respect to the CVT 2, the input disks 21 fixed to the CVT input shaft 1B rotate in a clockwise direction. The output disks 22 normally rotate in the opposite direction to the input disk 21. Thus the output disks 22 and the CVT output gear 230 rotate in a counter-clockwise direction. The gear 204A which meshes with the CVT output gear 230 and the sun gear 205A which engages with the gear 204A rotate in a clockwise direction.

The sun gear 205A and the planet carrier 205B both rotate in a clockwise direction in the planetary gear set 205. The rotational direction of the ring gear 205C varies in response to the speed ratio of the rotation of the sun gear 205A and the planet carrier 205B. When the vehicle is travelling forward, the ring gear 205C rotates in the same clockwise manner as the sun gear 205A and the planet carrier 205B. Consequently the IVT output gear 207 which is joined to the ring gear 205C via the IVT output shaft 206 rotates in a clockwise direction and the gear 213 rotates in a counter-clockwise direction.

The torque transmission of force between the gears will be described hereafter. During forward vehicle operation in power recirculation mode, torque is transmitted to the planet carrier 205B from the output gear 203B of the fixed speed ratio transmission 203. The carrier 205B rotates the ring gear 205C and the sun gear 205A.

Torque which is transmitted to the sun gear 205A is recirculated through the CVT 2 to the input gear 203A of the fixed speed ratio transmission 203. During reverse vehicle operation in power recirculation mode, the direction of torque recirculation is opposite to that described above.

When torque is transmitted between the helical gears, a force acting in a central direction and a force in a direction which is tangential to a base circle are applied to the engaging tooth faces. The composite force thereof applies a radial force to the central axes of the helical gears. In contrast, the sloping tooth faces of the helical gears apply a thrust force on the helical gears. The thrust force applies a bending moment on the central axes of the helical gears.

Both ends of the central shaft 204 are supported on bearings 251, 252. The output gear 203B of the fixed speed ratio transmission 203 is disposed in proximity to the bearing 251. The gear 204A is disposed in proximity to the bearing 252. Thus the radial force which acts on these gears apply little bending moment to the central shaft 204. The radial force which exerts a large bending moment on the central shaft 204 is a radial force Ro acting on the IVT output gear 207.

The thrust force which exerts a large bending moment of the central shaft 204 is a thrust force Fc applied to the gear 204A by the CVT output gear 230 and a thrust force Fg applied to the output gear 203B by the counter gear 203D of the fixed speed ratio transmission 3. In this IVT, the tooth traces of the helical gears 203B and 204A are determined according to the positional relationship of the rotation shafts 1B, 203E and 204 so that the bending moment created by the radial force Ro on the central shaft 204 is reduced by the thrust force Fc and the thrust force Fg.

When the vehicle is running forward in power recirculation mode, the output gear 203B of the fixed speed ratio transmission 203 is a driven gear which is driven by the input gear 203A through the counter gear 203D. The IVT output gear 207 is a drive gear which drives the final gear 212 through the gears 213 and 214. The gear 204A is also a drive gear since power is recirculated to the CVT 2 through the gear 204A from the sun gear 205A.

Referring now to FIG. 3, the angle subtended by a line connecting the central shaft 204 with the IVT input shaft 1A and the direction of application of the radial force Ro is designated as θ1. The angle subtended by a line connecting the central shaft 204 with the counter shaft 203E and the direction of application of the radial force Ro is designated as θ2. In this configuration, the IVT input shaft 1A, the counter shaft 203E and the counter shaft 215 forming the center of the gear 213 are disposed so that both the angles θ1 and θ2 are less than ninety degrees.

Figure 4A:
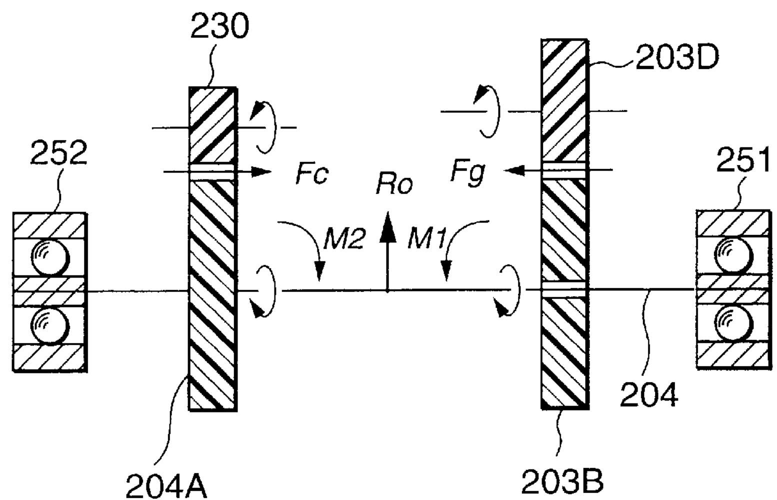
FIGS. 4A–4C are schematic diagrams of the essential parts of the IVT describing the bending moment applied to the IVT output shaft and the thrust force applied to the helical gears.

Referring to FIG. 4A, the tooth traces of both the output gear 203B and the gear 204A of the fixed speed ratio transmission 203 are respectively set as a right-handed thread. In contrast, the tooth trace of the counter gear 203D is set as a left-handed thread and the tooth trace of the input gear 203A of the fixed speed ratio transmission 203 is set as a right-handed thread. The tooth trace of the CVT output gear 230 which meshes with the gear 204A is set as a left-handed thread.

Referring again to FIG. 3, during forward vehicle operation in power recirculation mode, the gear 204A which is joined to the sun gear 205A rotates in a clockwise direction and drives the CVT output gear 230 in a counter-clockwise direction. A thrust force Fc oriented towards the right side of FIG. 4A is applied to the meshing sections of the gear 204A and the CVT output gear 230 as a result of the reaction force acting when the gear 204A drives the CVT output gear 230.

The output gear 203B of the fixed speed ratio transmission 203 which is joined to the planet carrier 205B via the power recirculation clutch 209 rotates in a clockwise direction. A thrust force Fg oriented towards the left side of FIG. 4A is applied to the meshing sections of the counter gear 203D and the output gear 203B due to the driving force applied to the output gear 203B from the counter gear 203D.

The total bending moment acting on the central shaft 204 is suppressed to a small value due to the fact that the bending moments M1 and M2 which are applied to the central shaft 204 by the thrust forces Fc and Fg act in the opposite direction to the bending moment applied to the central shaft 204 by the radial force Ro.

Figure 4B:
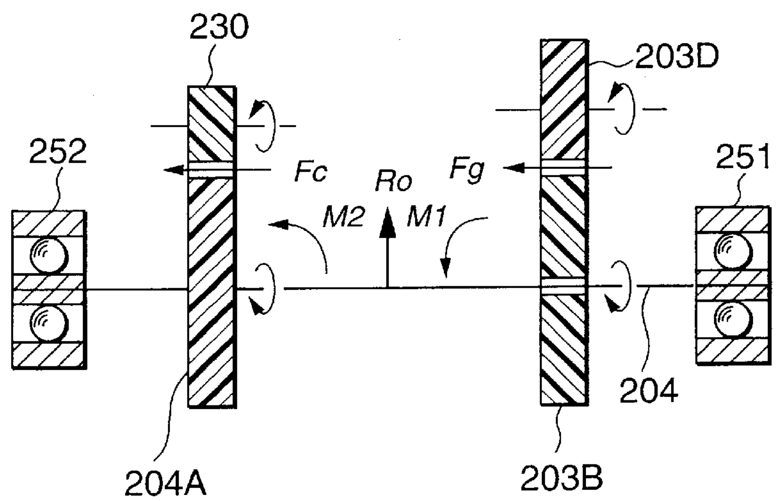
Figure 4C:
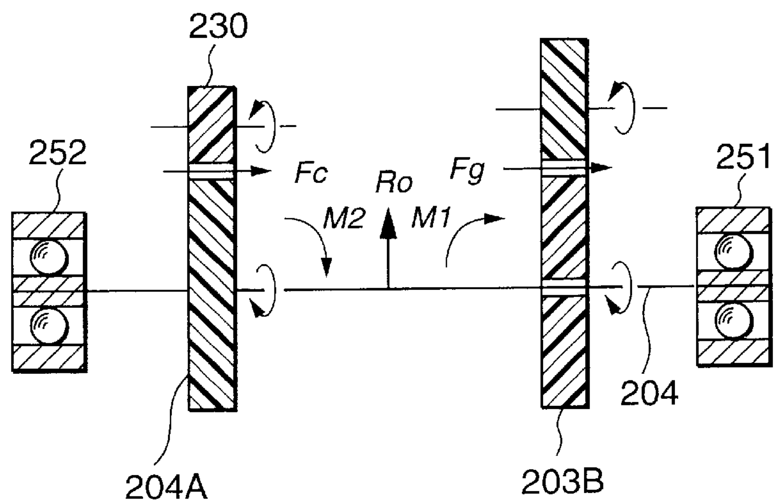

FIG. 4B shows the application of forces when the tooth trace of the gear 204A is set as left-handed and the tooth trace of the gear 203B is set as right-handed. FIG. 4C shows the application of forces when the tooth trace of the gear 204 is set as right-handed and the tooth trace of the gear 203B is set as left-handed. The tooth trace of the input gear 203A and the counter gear 203D of the fixed speed ratio transmission 203 is set to correspond to the tooth trace of the gear 203B. The tooth trace of the CVT output gear 230 is set to correspond to the gear 204A.

The settings of the tooth traces shown in both FIG. 4B and FIG. 4C adapt the direction of the bending moment applied on the central shaft 204 so that one of the three forces Ro, Fg, Fc is oriented in an opposite direction to the bending moment applied to the central shaft 204 by the other two forces. As a result, it is possible to suppress the total amount of the bending moment applied to the central shaft 204 to a small level. Consequently, it is possible to reduce the load on the bearings 251 and 252.

The dimension and point of application of the forces Ro, Fc, and Fg determine which setting of the tooth trace shown in FIGS. 4A–4C minimizes the bending moment acting on the central shaft 204. Thus it is preferred that a setting which minimizes the bending moment is selected from the three settings for the tooth trace as shown in FIGS. 4A–4C according to the configuration of the IVT.

The preferred direction for the tooth traces of the gear 204A and the gear 203B differs corresponding to the setting of the angles θ1 and θ2. Preferred settings for the tooth traces according to the setting of the angles θ1 and θ2 will be described as second to fourth embodiments.

Figure 5:
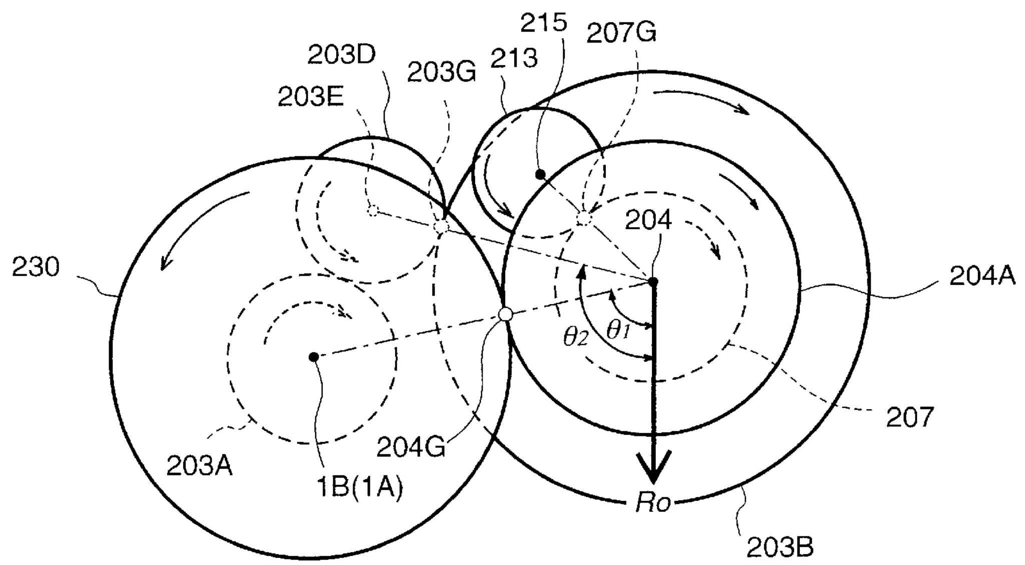
FIG. 5 is similar to FIG. 3, but showing a second embodiment of this invention.
Figure 6:
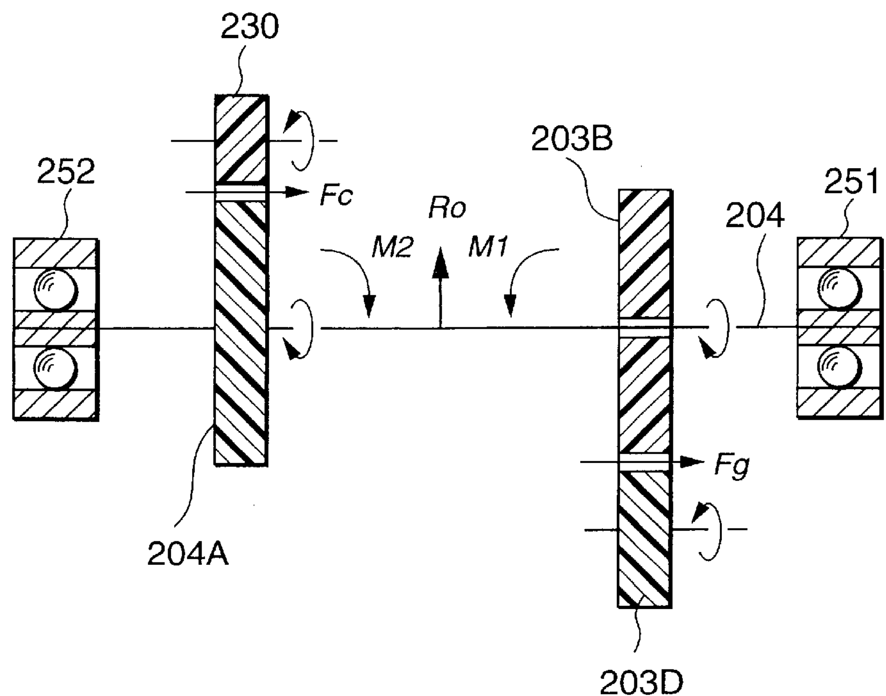
FIG. 6 is a schematic diagram of the essential parts of the IVT describing the bending moment applied to the IVT output shaft and the thrust force applied to the helical gears according to the second embodiment of this invention.

Referring to FIGS. 5 and 6, the second embodiment of this invention will be described.

In this embodiment, as shown in FIG. 5, the IVT input shaft 1A, the counter shaft 203E and the counter shaft 215 are disposed so that the angle θ1 is smaller than ninety degrees and the angle θ2 is greater than ninety degrees. As shown in FIG. 6, the tooth trace of the gear 203B is set as left-handed and the tooth trace of the gear 204A is set as right-handed. The tooth traces of the input gear 203A and the counter gear 203D of the fixed speed ratio transmission 203 are set corresponding to the tooth trace of the gear 203B. The tooth trace of the CVT output gear 230 is set corresponding to the gear 204A.

In this embodiment, in the same manner as the case of FIG. 4A in the first embodiment, the bending moments M1 and M2 produced by the action of the thrust forces Fg and Fc are oriented in an opposite direction as shown in FIG. 6 to the bending moment applied by the radial force Ro on the central shaft 204. This results in the same effect as the arrangement shown in FIG. 4A.

When the tooth trace of one of the gear 203B and the gear 204A is set in the opposite direction, the same effect as the case of FIG. 4B or FIG. 4C in the first embodiment is obtained.

Figure 8:
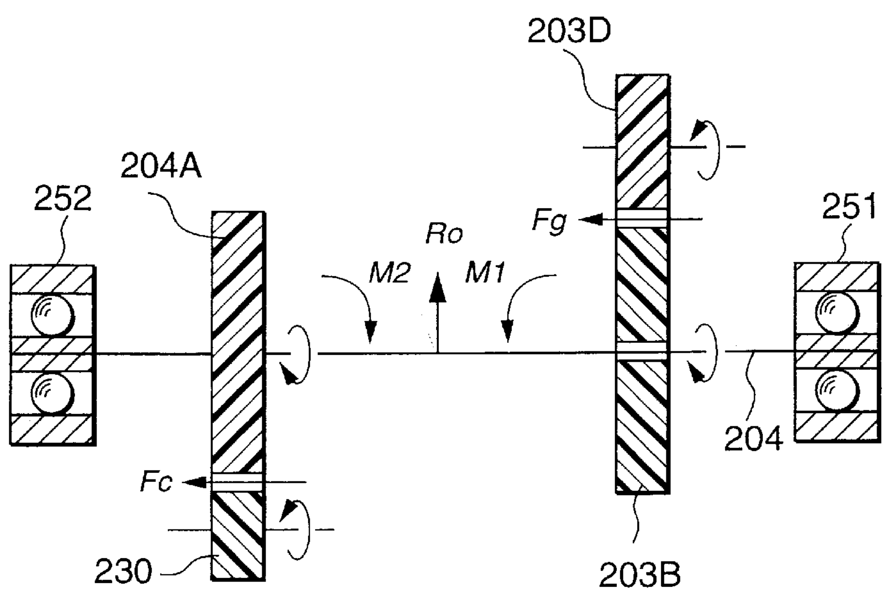
FIG. 8 is similar to FIG. 6, but showing a third embodiment of this invention.
Figure 7:
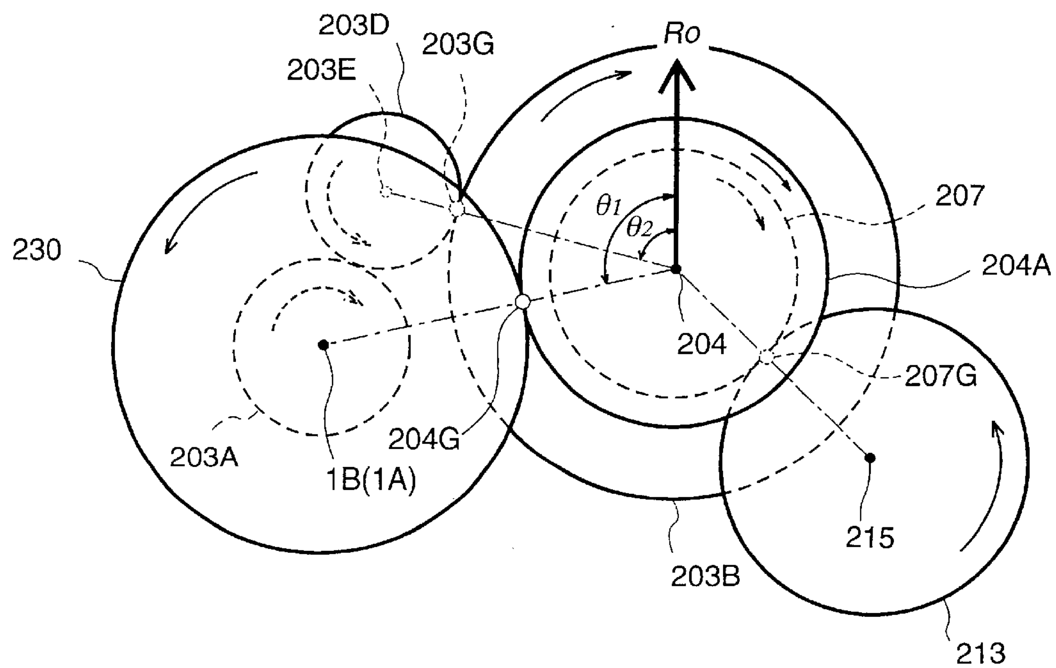
FIG. 7 is similar to FIG. 3, but showing a third embodiment of this invention.

Referring to FIGS. 7 and 8, the third embodiment of this invention will be described.

In this embodiment, as shown in FIG. 7, the IVT input shaft 1A, the counter shaft 203E and the counter shaft 215 are disposed so that the angle θ1 is greater than ninety degrees and the angle θ2 is smaller than ninety degrees. As shown in FIG. 8, the tooth trace of the gear 203B is set as right-handed and the tooth trace of the gear 204A is set as left-handed. The tooth traces of the input gear 203A and the counter gear 203D of the fixed speed ratio transmission 203 are set corresponding to the tooth trace of the gear 203B. The tooth trace of the CVT output gear 230 is set corresponding to the gear 204A.

In this embodiment, in the same manner as the case of FIG. 4A in the first embodiment, the bending moments M1 and M2 produced by the action of the thrust forces Fg and Fc are oriented in an opposite direction as shown in FIG. 8 to the bending moment applied by the radial force Ro on the central shaft 204. This results in the same effect as the arrangement shown in FIG. 4A.

When the tooth trace of one of the gear 203B and the gear 204A is set in the opposite direction, the same effect as the case of FIG. 4B or FIG. 4C in the first embodiment is obtained.

Figure 9:
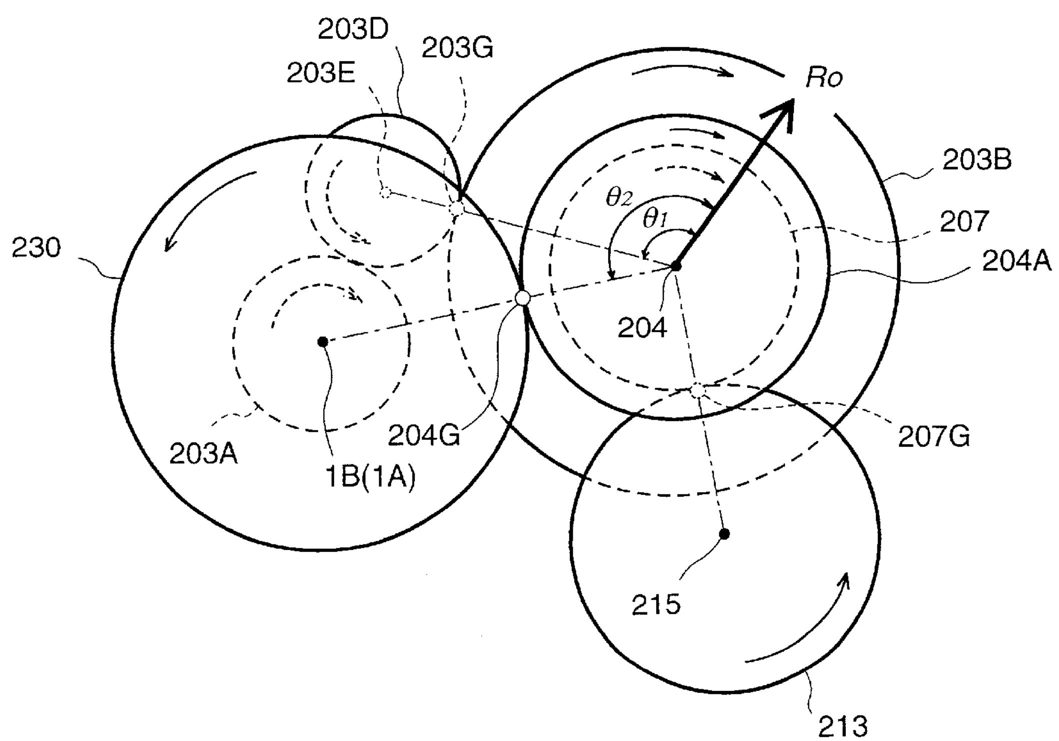
FIG. 9 is similar to FIG. 3, but showing a fourth embodiment of this invention.
Figure 10:
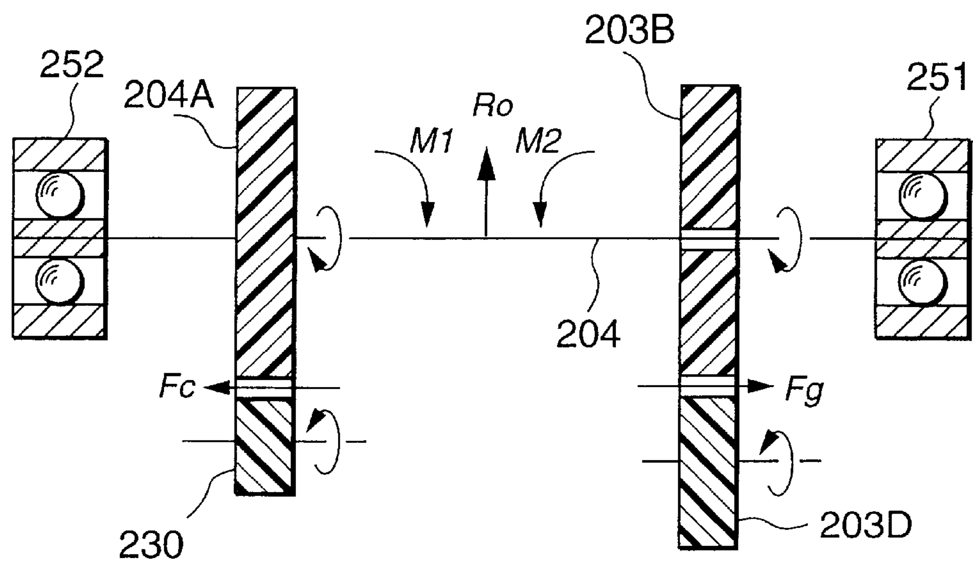
FIG. 10 is similar to FIG. 6, but showing the fourth embodiment of this invention.

Referring now to FIGS. 9 and 10, the fourth embodiment of this invention will be described.

In this embodiment, as shown in FIG. 9, the IVT input shaft 1A, the counter shaft 203E and the counter shaft 215 are disposed so that the angle θ1 and the angle θ2 are greater than 90 degrees. As shown in FIG. 10, the tooth trace of the gear 203B is left-handed and the tooth trace of the gear 204A is left-handed. The tooth trace of the input gear 203A and the counter gear 203D of the fixed speed ratio transmission 203 is set corresponding to the tooth trace of the gear 203B. The tooth trace of the CVT output gear 230 is set corresponding to the gear 204A.

In this embodiment, in the same manner as the case of FIG. 4A in the first embodiment, the bending moments M1 and M2 produced by the action of the thrust forces Fg and Fc are oriented in an opposite direction as shown in FIG. 10 to the bending moment applied by the radial force Ro on the central shaft 204. This results in the same effect as the arrangement shown in FIG. 4A.

When the tooth trace of one of the gear 203B and the gear 204A is set in the opposite direction, the same effect as the case of FIG. 4B or FIG. 4C in the first embodiment is obtained.

Figure 13:
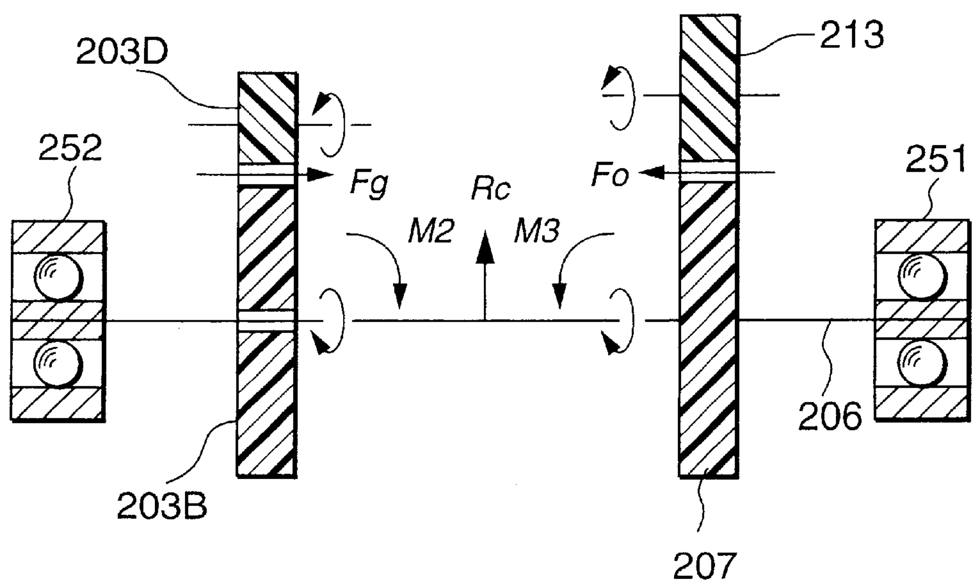
FIG. 13 is similar to FIG. 6, but showing the fifth embodiment of this invention.
Figure 11:
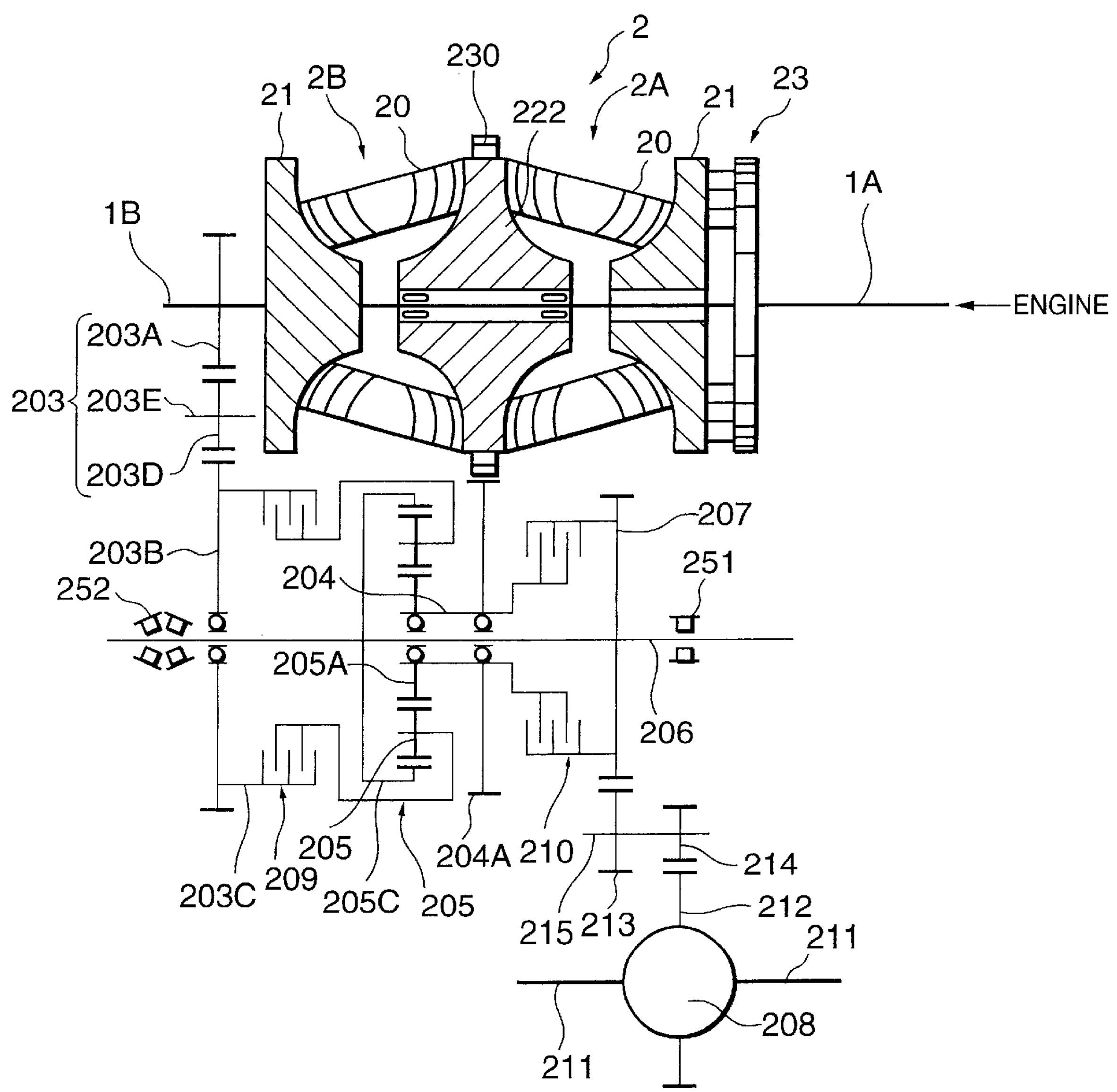
FIG. 11 is a schematic diagram of an infinitely variable transmission (IVT) according to a fifth embodiment of this invention.
Figure 12:
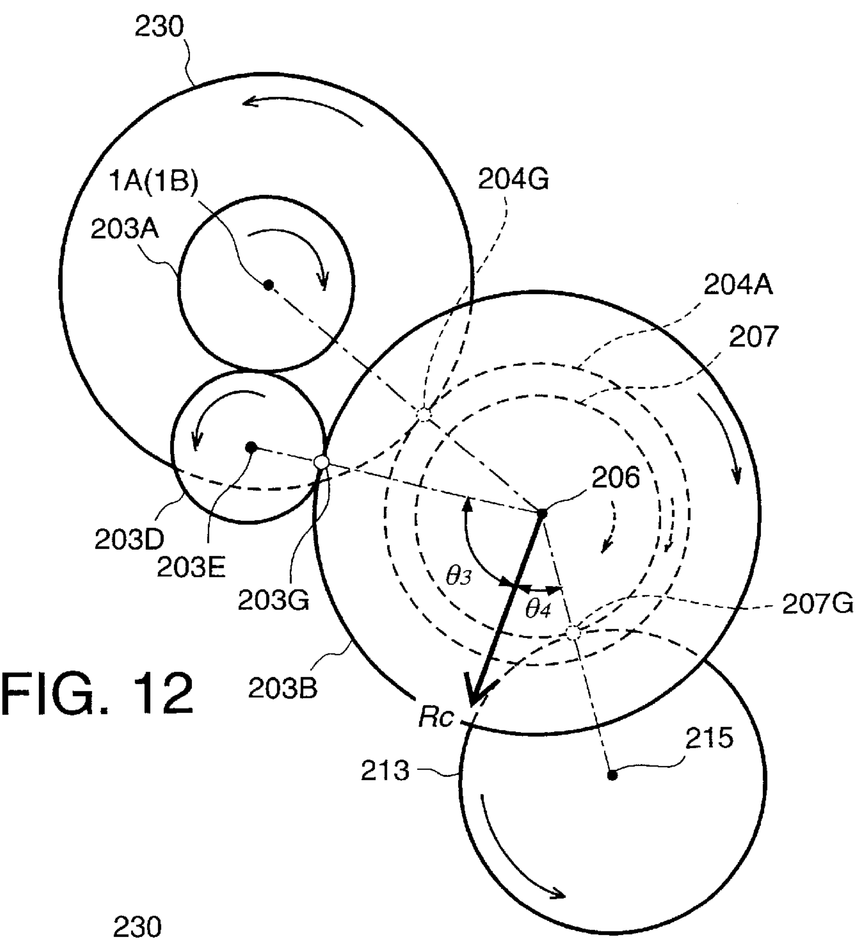
FIG. 12 is similar to FIG. 3, but showing the fifth embodiment of this invention.

Referring now to FIGS. 11–13, a fifth embodiment of this invention will be described.

This embodiment describes the application of this invention to an IVT as disclosed in the aforementioned Tokkai Hei 11-63139.

Firstly referring to FIG. 11, the position of the fixed speed ratio transmission 203 and the CVT 2 are reversed in this IVT when compared to the IVT as shown in FIG. 1. The CVT 2 is disposed in proximity to the engine.

The gear 204A is disposed between the IVT output gear 207 and the output gear 203B of the fixed speed ratio transmission 203. As a result, the central shaft 204 is arranged on an outer side of the IVT output shaft 206 and supported by the IVT output shaft 206. In this embodiment, the IVT output shaft 206 is supported by the bearings 251 and 252 rather than the central shaft 204. During forward vehicle operation in power recirculation mode, the gear 203B is a driven gear and the IVT output gear 207 is a drive gear in the same manner as in the case of the first–fourth embodiments.

In this embodiment, direction of the tooth trace of the gears 203B and 207 and the positional relationship of the respective shafts are set so that the bending moment applied to the IVT output shaft 206 by the radial force Rc acting on the gear 204A is reduced.

Referring now to FIG. 12, the angle subtended by a line connecting the IVT output shaft 206 and the counter shaft 203E and the direction of application of the radial force Rc is designated as θ3. The angle subtended by a line connecting the IVT output shaft 206 with the counter shaft 215 and the direction of application of the radial force Rc is designated as θ4.

In this IVT, the IVT input shaft 1A, the counter shaft 203E and the counter shaft 215 are disposed so that both the angles θ3 and θ4 are less than ninety degrees. As shown in FIG. 13, the tooth traces of both the gear 203B and the gear 204A are set as a left-hand thread. The tooth traces of the counter gear 203D and the input gear 203A of the fixed speed ratio transmission 203 are set corresponding to the tooth trace of the gear 203B. The tooth trace of the gear 213 is set corresponding to the gear 207.

During forward vehicle operation in power recirculation mode, the thrust force Fg to the right side of FIG. 13 is applied to a gear 203B and the thrust force Fo to the left side of the figure is applied to the gear 207. The bending moment M2 applied by the thrust force Fg on the IVT output shaft 206 and the bending moment M3 applied by the thrust force Fo on the IVT output shaft 206 both act in an opposite direction to the bending moment applied by the radial force Rc acting on the IVT output shaft 206. Thus it is possible to suppress the total bending moment applied on the IVT output shaft 206 to a small level.

The above embodiment shows that this invention can be effectively applied to an IVT which supports the IVT output shaft 206 with the bearings 251 and 252.

Figure 14:
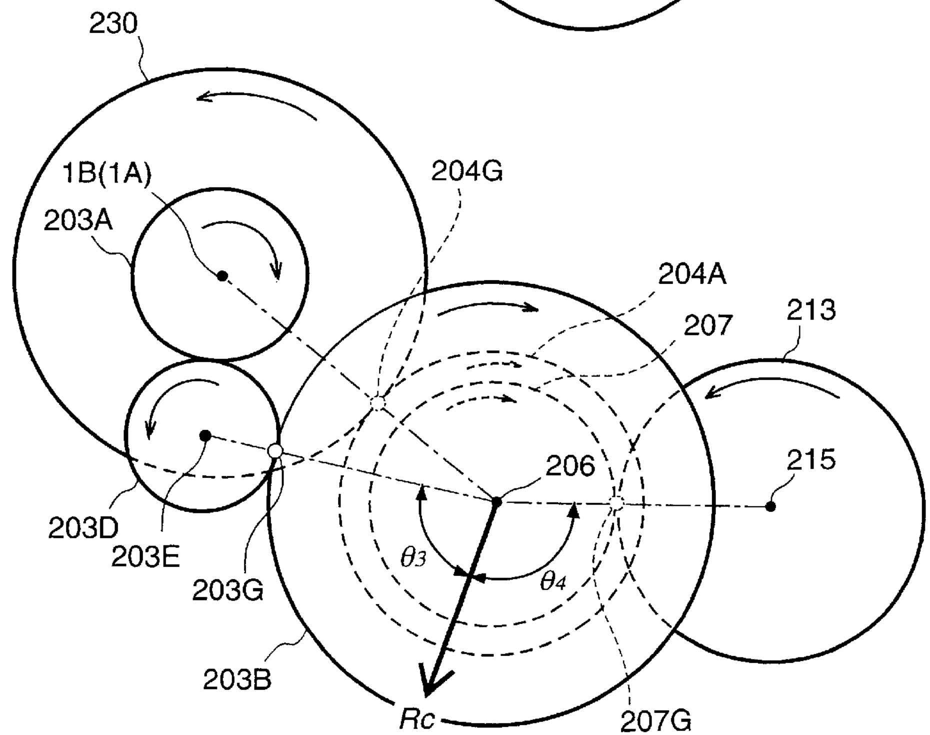
FIG. 14 is similar to FIG. 3, but showing a sixth embodiment of this invention.
Figure 15:
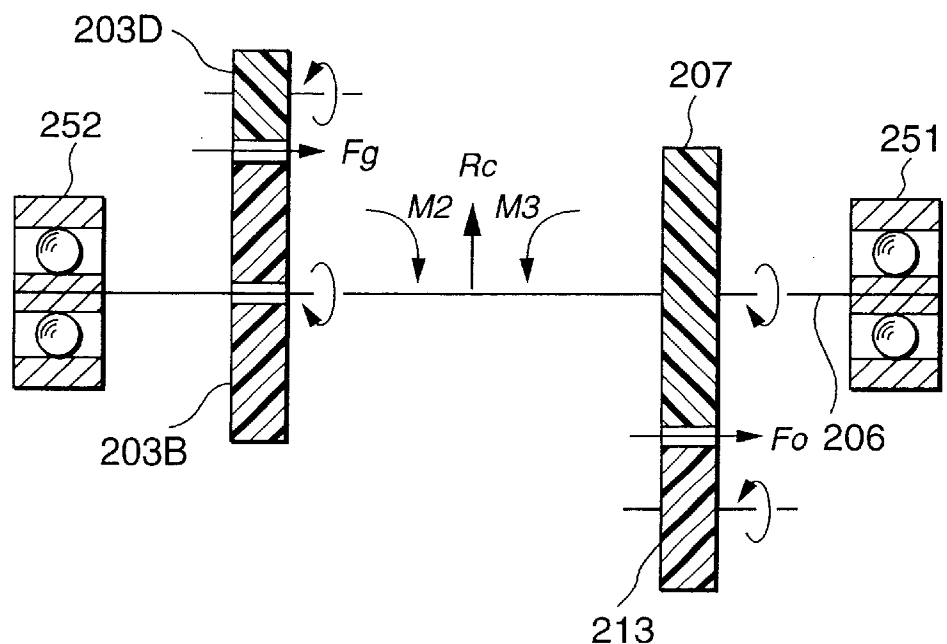
FIG. 15 is similar to FIG. 6, but showing the sixth embodiment of this invention.

Referring to FIGS. 14 and 15, a sixth embodiment of this invention will be described.

In this embodiment, as shown in FIG. 14, the IVT input shaft 1A, the counter shaft 203E and the counter shaft 215 are disposed so that the angle θ3 is smaller than ninety degrees and the angle θ4 is greater than ninety degrees.

As shown in FIG. 15, the tooth trace of the gear 203B is set as left-handed and the tooth trace of the gear 207 is set as right-handed. The tooth traces of the counter gear 203D and the input gear 203A of the fixed speed ratio transmission 203 are set corresponding to the tooth trace of the gear 203B. The tooth trace of the gear 213 is set corresponding to the gear 207.

During forward vehicle operation in power recirculation mode, the thrust force Fg to the right side of FIG. 15 is applied to a gear 203B and the thrust force Fo to the right side of the figure is applied to the gear 207. The bending moment M2 applied by the thrust force Fg on the IVT output shaft 206 and the bending moment M3 applied by the thrust force Fo on the IVT output shaft 206 both act in an opposite direction to the bending moment applied by the radial force Rc acting on the IVT output shaft 206. Thus this embodiment also makes it possible to suppress the total bending moment applied on the IVT output shaft 206 to a small level in the same manner as the fifth embodiment.

In this embodiment, it is possible to set the tooth trace of one of the gears 203B and the gear 207 in an opposite direction. As a result, the direction of the bending moment resulting on the IVT output shaft 206 from one of the three forces Ro, Fg, Fc is oriented in an opposite direction to the direction of the bending moment applied to the IVT output shaft 206 by the other two forces. As a result, the above settings also make it possible to suppress the total amount of the bending moment applied to the central shaft 204 to a small level. Consequently, it is desirable to select settings which minimize the bending moment according to the configuration of the IVT.

Figure 17:
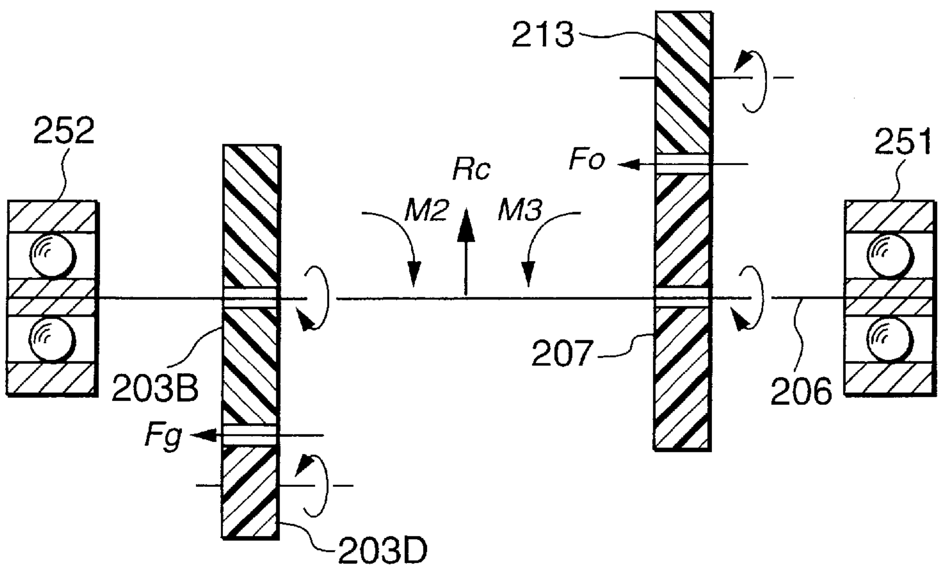
FIG. 17 is similar to FIG. 6, but showing the seventh embodiment of this invention.
Figure 16:
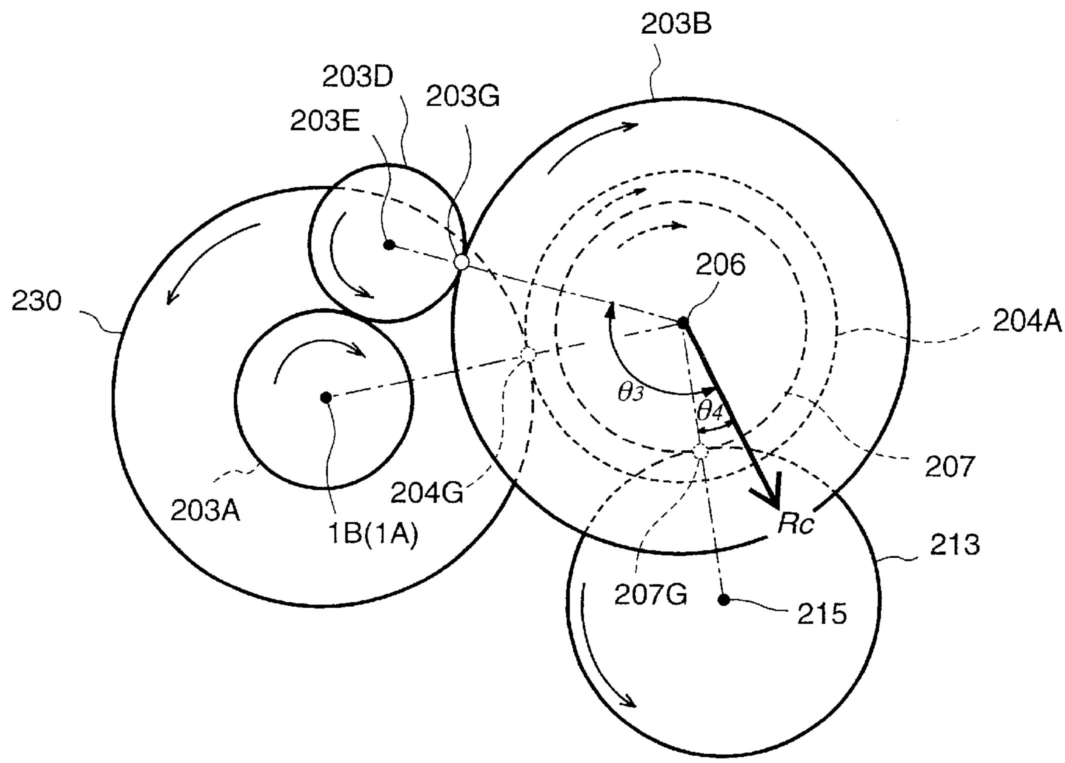
FIG. 16 is similar to FIG. 3, but showing a seventh embodiment of this invention.

Referring to FIGS. 16 and 17, a seventh embodiment of this invention will be described.

In this embodiment, as shown in FIG. 16, the IVT input shaft 1A, the counter shaft 203E and the counter shaft 215 are disposed so that the angle θ3 is greater than ninety degrees and the angle θ4 is smaller than ninety degrees.

As shown in FIG. 17, the tooth trace of the gear 203B is set as right-handed and the tooth trace of the gear 207 is set as left-handed. The tooth traces of the counter gear 203D and the input gear 203A of the fixed speed ratio transmission 203 are set corresponding to the tooth trace of the gear 203B. The tooth trace of the gear 213 is set corresponding to the gear 207.

As a result, during forward vehicle operation in power recirculation mode, the thrust force Fg to the left side of FIG. 17 is applied to a gear 203B and the thrust force Fo to the left side of the figure is applied to the gear 207. The bending moment M2 applied by the thrust force Fg on the IVT output shaft 206 and the bending moment M3 applied by the thrust force Fo on the IVT output shaft 206 both act in an opposite direction to the bending moment applied by the radial force Rc acting on the IVT output shaft 206.

Thus this embodiment also makes it possible to suppress the total bending moment applied on the IVT output shaft 206 to a small level in the same manner as the fifth and sixth embodiments. It is also possible to set the tooth trace of one of the gears 203B and the gear 207 in an opposite direction according to the configuration of the IVT.

Figure 18:
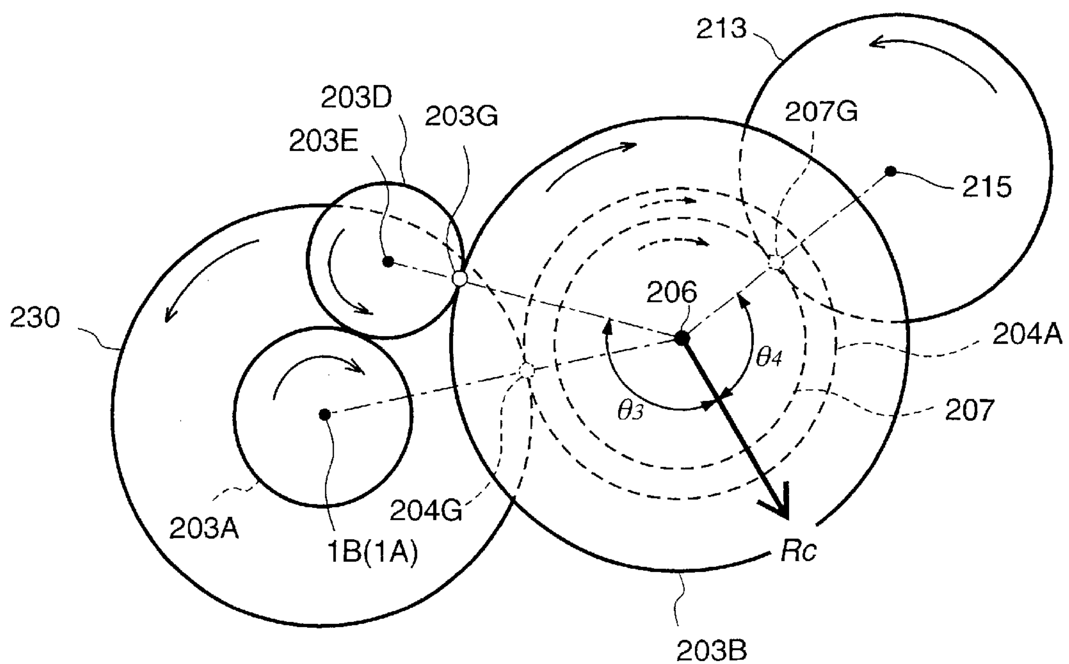
FIG. 18 is similar to FIG. 3, but showing an eighth embodiment of this invention.
Figure 19:
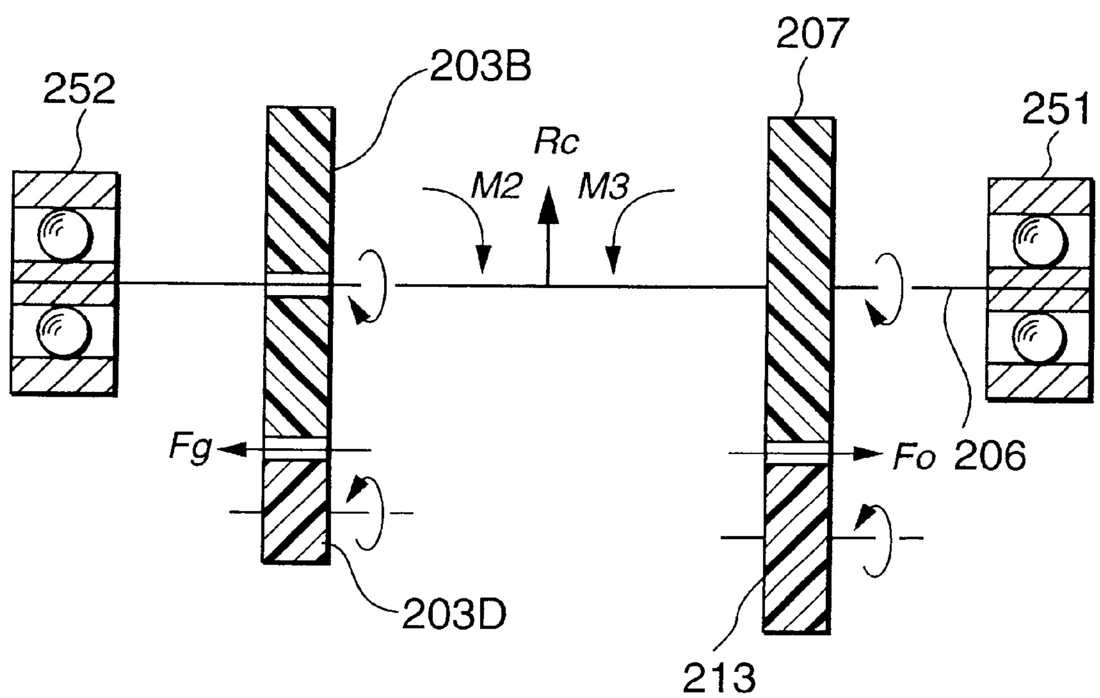
FIG. 19 is similar to FIG. 6, but showing the eighth embodiment of this invention.

Referring to FIGS. 18 and 19, an eighth embodiment of this invention will be described.

In this embodiment, as shown in FIG. 18, the IVT input shaft 1A, the counter shaft 203E and the counter shaft 215 are disposed so that the angles θ3 and θ4 are both greater than ninety degrees.

As shown in FIG. 19, the tooth traces of both the gear 203B and the gear 207 are right-handed. The tooth traces of the counter gear 203D and the input gear 203A of the fixed speed ratio transmission 3 are set corresponding to the tooth trace of the gear 203B. The tooth trace of the gear 213 is set corresponding to the gear 207.

As a result, during forward vehicle operation in power recirculation mode, the thrust force Fg to the left side of FIG. 19 is applied to the gear 203B and the thrust force Fo to the right side of the figure is applied to the gear 207. The bending moment M2 applied by the thrust force Fg on the IVT output shaft 206 and the bending moment M3 applied by the thrust force Fo on the IVT output shaft 206 both act in an opposite direction to the bending moment applied by the radial force Rc acting on the IVT output shaft 206.

This arrangement makes it possible to suppress the total bending moment applied on the IVT output shaft 206 to a small level in the same manner as the fifth to seventh embodiments. It is also possible to set the tooth trace of one of the gears 203B and the gear 207 in an opposite direction according to the configuration of the IVT as described above.

The first to fourth embodiments are applied to an IVT which disposes the IVT output gear 207 between the output gear 203B of the fixed speed ratio transmission 203 and the gear 204A. The fifth to eighth embodiments are applied to an IVT which disposes the gear 204A between the output gear 203B of the fixed speed ratio transmission 203 and the IVT output gear 207. This invention can also be applied to an IVT which disposes the output gear 203B between the gear 204A and the IVT output gear 207.

In each of the above embodiments, the gear 4A corresponds to the first helical gear in the claims, the output gear 203B of the fixed speed ratio transmission 3 corresponds to the second helical gear in the claims, and the IVT output gear 207 corresponds to the third helical gear in the claims. In the first to the fourth embodiments, the central shaft 204 corresponds to the rotation shaft in the claims. In the fifth to the eighth embodiments, the IVT output shaft 206 corresponds to the rotation shaft in the claims.

The contents of Tokugan 2001-62938, with a filing date of Mar. 7, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

What is claimed is:

1. An infinitely variable transmission, comprising:

an input shaft;

a continuously variable transmission which outputs a rotation of the input shaft to a first helical gear at an arbitrary speed ratio;

a fixed speed ratio transmission which outputs a rotation of the input shaft to a second helical gear at a fixed speed ratio; and a third helical gear which changes a rotation direction and a rotation speed according to a difference between a rotation speed of the first helical gear and a rotation speed of the second helical gear, the first helical gear, the second helical gear and the third helical gear being supported on a common rotation shaft, one of the first helical gear, the second helical gear and the third helical gear being disposed between the other two gears and one of the other two gears having a tooth trace which generates a thrust force exerting a bending moment on the rotation shaft in a direction opposite to a direction of a bending moment exerted by a radial force acting on the gear which is disposed between the other two gears on the rotation shaft.

2. The infinitely variable transmission as defined in claim 1, wherein the infinitely variable transmission further comprises two bearings which respectively support the rotation shaft nearby the other two gears.

3. The infinitely variable transmission as defined in claim 1, wherein the infinitely variable transmission is mounted on a vehicle to drive the vehicle forward, the input shaft is connected to an engine of the vehicle, and the third helical gear is connected to a drive shaft of the vehicle.

4. The infinitely variable transmission as defined in claim 3, wherein the continuously variable transmission comprises a fourth helical gear which is meshed with and driven by the first helical gear when the infinitely variable transmission drives the vehicle forward, the fixed speed ratio transmission comprises a fifth helical gear which is meshed with and drives the second helical gear when the infinitely variable transmission drives the vehicle forward, and the third helical gear is meshed with a sixth helical gear which is connected to the drive shaft of the vehicle.

5. The infinitely variable transmission as defined in claim 4, wherein the one of the first helical gear, the second helical gear and the third helical gear corresponds to the third helical gear, and the fixed speed ration transmission is disposed nearer to the engine than the continuously variable transmission.

6. The infinitely variable transmission as defined in claim 5, wherein a first angle subtended by a line connecting a center of the fourth helical gear with a center of the rotation shaft and a direction of a radial force which the sixth helical gear exerts on the third helical gear when the infinitely variable transmission drives the vehicle forward, is set smaller than ninety degrees, a second angle subtended by a line connecting a center of the fifth helical gear with the center of the rotation shaft and the direction of the radial force, is set smaller than ninety degrees, the second helical gear rotates in a clockwise direction when the second helical gear is viewed from the side of the first helical gear and the infinitely variable transmission drives the vehicle forward, the first helical gear rotates in a same direction as the second helical gear when the infinitely variable transmission drives the vehicle forward, and both the first helical gear and the second helical gear are arranged to have right-handed tooth traces.

7. The infinitely variable transmission as defined in claim 5, wherein a first angle subtended by a line connecting a center of the fourth helical gear with a center of the rotation shaft and a direction of a radial force which the sixth helical gear exerts on the third helical gear when the infinitely variable transmission drives the vehicle forward, is set larger than ninety degrees, a second angle subtended by a line connecting a center of the fifth helical gear with the center of the rotation shaft and the direction of the radial force, is set smaller than ninety degrees,the second helical gear rotates in a clockwise direction when the second helical gear is viewed from the side of the first helical gear and the infinitely variable transmission drives the vehicle forward, the first helical gear rotates in a same direction as the second helical gear when the infinitely variable transmission drives the vehicle forward, and the first helical gear is arranged to have a left-handed tooth trace while the second helical gear is arranged to have a right-handed tooth trace.

8. The infinitely variable transmission as defined in claim 5, wherein a first angle subtended by a line connecting a center of the fourth helical gear with a center of the rotation shaft and a direction of a radial force which the sixth helical gear exerts on the third helical gear when the infinitely variable transmission drives the vehicle forward, is set smaller than ninety degrees, a second angle subtended by a line connecting a center of the fifth helical gear with the center of the rotation shaft and the direction of the radial force, is set larger than ninety degrees, the second helical gear rotates in a clockwise direction when the second helical gear is viewed from the side of the first helical gear and the infinitely variable transmission drives the vehicle forward, the first helical gear rotates in a same direction as the second helical gear when the infinitely variable transmission drives the vehicle forward, and the first helical gear is arranged to have a right-handed tooth trace while the second helical gear is arranged to have a left-handed tooth trace.

9. The infinitely variable transmission as defined in claim 5, wherein a first angle subtended by a line connecting a center of the fourth helical gear with a center of the rotation shaft and a direction of a radial force which the sixth helical gear exerts on the third helical gear when the infinitely variable transmission drives the vehicle forward, is set larger than ninety degrees, a second angle subtended by a line connecting a center of the fifth helical gear with the center of the rotation shaft and the direction of the radial force, is set larger than ninety degrees, the second helical gear rotates in a clockwise direction when the second helical gear is viewed from the side of the first helical gear and the infinitely variable transmission drives the vehicle forward, the first helical gear rotates in a same direction as the second helical gear when the infinitely variable transmission drives the vehicle forward, and both the first helical gear and the second helical gear are arranged to have left-handed tooth traces.

10. The infinitely variable transmission as defined in claim 4, wherein the one of the first helical gear, the second helical gear and the third helical gear corresponds to the first helical gear, and the continuously variable transmission is disposed nearer to the engine than the fixed speed ratio transmission.

11. The infinitely variable transmission as defined in claim 10, wherein, a third angle subtended by a line connecting a center of the fifth helical gear with a center of the rotation shaft and a direction of a radial force which the fourth helical gear exerts on the first helical gear when the infinitely variable transmission drives the vehicle forward, is set smaller than ninety degrees, a fourth angle subtended by a line connecting a center of the sixth helical gear with the center of the rotation shaft and the direction of the radial force, is set smaller than ninety degrees, the third helical gear rotates in a clockwise direction when the third helical gear is viewed from the side of the second helical gear and the infinitely variable transmission drives the vehicle forward, the second helical gear rotates in a same direction as the third helical gear when the infinitely variable transmission drives the vehicle forward, and both the second helical gear and the third helical gear are arranged to have left-handed tooth traces.

12. The infinitely variable transmission as defined in claim 10, wherein, a third angle subtended by a line connecting a center of the fifth helical gear with a center of the rotation shaft and a direction of a radial force which the fourth helical gear exerts on the first helical gear when the infinitely variable transmission drives the vehicle forward, is set smaller than ninety degrees, a fourth angle subtended by a line connecting a center of the sixth helical gear with the center of the rotation shaft with respect to the direction of the radial force is set larger than ninety degrees, the third helical gear rotates in a clockwise direction when the third helical gear is viewed from the side of the second helical gear and the infinitely variable transmission drives the vehicle forward, the second helical gear rotates in a same direction as the third helical gear when the infinitely variable transmission drives the vehicle forward, and the second helical gear is arranged to have a left-handed tooth trace while the third helical gear is arranged to have a right-handed tooth trace.

13. The infinitely variable transmission as defined in claim 10, wherein, a third angle subtended by a line connecting a center of the fifth helical gear with a center of the rotation shaft and a direction of a radial force which the fourth helical gear exerts on the first helical gear when the infinitely variable transmission drives the vehicle forward, is set larger than ninety degrees, a fourth angle subtended by a line connecting a center of the sixth helical gear with the center of the rotation shaft and the direction of the radial force, is set smaller than ninety degrees, the third helical gear rotates in a clockwise direction when the third helical gear is viewed from the side of the second helical gear and the infinitely variable transmission drives the vehicle forward, the second helical gear rotates in a same direction as the third helical gear when the infinitely variable transmission drives the vehicle forward, and the second helical gear is arranged to have a right-handed tooth trace while the third helical gear is arranged to have a left-handed tooth trace.

14. The infinitely variable transmission as defined in claim 10, wherein, a third angle subtended by a line connecting a center of the fifth helical gear with a center of the rotation shaft and a direction of a radial force which the fourth helical gear exerts on the first helical gear when the infinitely variable transmission drives the vehicle forward, is set larger than ninety degrees, a fourth angle subtended by a line connecting a center of the sixth helical gear with the center of the rotation shaft and the direction of the radial force, is set larger than ninety degrees, the third helical gear rotates in a clockwise direction when the third helical gear is viewed from the side of the second helical gear and the infinitely variable transmission drives the vehicle forward, the second helical gear rotates in a same direction as the third helical gear when the infinitely variable transmission drives the vehicle forward, and both the second helical gear and the third helical gear are arranged to have right-handed tooth traces.

15. The infinitely variable transmission as defined in claim 1, wherein the infinitely variable transmission further comprises a fourth helical gear with which the gear disposed between the other two gears is engaged, and the bending moment which the gear disposed between the other two gears exerts on the rotation shaft is caused by a radial force which the fourth helical gear exerts on the gear disposed between the other two gears.

16. The infinitely variable transmission as defined in claim 1, wherein the one gear of the other two gears is engaged with a fifth helical gear and the bending moment which one gear of the other two gears exerts on the rotation shaft is caused by a thrust force which the fifth helical gear exerts on one gear of the other two gears.

17. The infinitely variable transmission as defined in claim 1, wherein both of the other two ears have tooth traces each of which generates a thrust force exerting a bending moment on the rotation shaft in the direction opposite to the direction of the bending moment which the gear disposed between the other two gears exerts on the rotation shaft.

18. The infinitely variable transmission as defined in claim 1, wherein one gear of the other two gears has a tooth trace which generates a thrust force exerting a bending moment on the rotation shaft in a direction identical to the direction of the bending moment which the gear disposed between the other two gears exerts on the rotation shaft.

19. The infinitel variable transmission as defined in claim 2, wherein the infinitely variable transmission further comprises a fourth helical gear with which the gear disposed between the other two gears is engaged, and the bending moment which the gear disposed between the other two gears exerts on the rotation shaft is caused by a radial force which the fourth helical gear exerts on the gear disposed between the other two gears.

20. The infinitely variable transmission as defined in claim 3, wherein the infinitely variable transmission further comprises a fourth helical gear with which the gear disposed between the other two gears is engaged, and the bending moment which the gear disposed between the other two gears exerts on the rotation shaft is caused by a radial force which the fourth helical gear exerts on the gear disposed between the other two gears.

21. The infinitely variable transmission as defined in claim 2, wherein the one gear of the other two gear is engaged with a fifth helical gear and the bending moment which one gear of the other two gears exerts on the rotation shaft is caused by a thrust force which the fifth helical gear exerts on one gear of the other two gears.

22. The infinitely variable transmission as defined in claim 3, wherein the one gear of the other two gears is engaged with a fifth helical gear and the bending moment which one gear of the other two gears exerts on the rotation shaft is caused by a thrust force which the fifth helical gear exerts on one gear of the other two gears.

23. The infinitely variable transmission as defined in claim 2, wherein both of the other two gears have tooth traces each of which generates a thrust force exerting a bending moment on the rotation shaft in the direction opposite to the direction of the bending moment which the gear disposed between the other two gears exerts on the rotation shaft.

24. The infinitel variable transmission as defined in claim 3, wherein both of the other two gears have to the traces each of which generates a thrust force exerting a bending moment on the rotation shaft in the direction opposite to the direction of the bending moment which the gear disposed between the other two gears exerts on the rotation shaft.

25. The infinitely variable transmission as defined in claim 2, wherein one gear of the other two gears ha a tooth trace which generates a thrust force exerting a bending moment on the rotation shaft in a direction identical to the direction of the bending moment which the gear disposed between the other two gears exerts on the rotation shaft.

26. The infinitely variable transmission as defined in claim 3, wherein one gear of the other two gears has a tooth trace which generates a thrust force exerting a bending moment on the rotation shaft in a direction identical to the direction of the bending moment which the gear disposed between the other two gears exerts on the rotation shaft.

* * * * *